United States Patent [19]
Luttrell et al.

[11] 4,116,081
[45] Sep. 26, 1978

[54] SPROCKET PROFILE

[75] Inventors: Richard W. Luttrell, Morton; Robert J. Purcell, Washington, both of Ill.

[73] Assignee: Caterpillar Tractor Co., Peoria, Ill.

[21] Appl. No.: 800,387

[22] Filed: May 25, 1977

[51] Int. Cl.² ............... F16H 55/30; F16H 55/06
[52] U.S. Cl. ............................. 74/243 R; 74/462
[58] Field of Search ............ 74/216.5, 243 R, 245 R, 74/462, 457

[56] References Cited
U.S. PATENT DOCUMENTS

| | | | |
|---|---|---|---|
| 2,162,042 | 6/1939 | Welser | 74/245 R |
| 3,756,091 | 9/1973 | Miller | 74/243 R |
| 3,897,980 | 8/1975 | Dester | 74/243 R X |
| 3,916,708 | 11/1975 | Durand | 74/243 R |
| 4,016,772 | 4/1977 | Clemens et al. | 74/243 R |
| 4,058,352 | 11/1977 | Sogge | 74/243 R X |

FOREIGN PATENT DOCUMENTS 4,738,924 9/1968 Japan ......................... 74/243

Primary Examiner—Leonard H. Gerin
Attorney, Agent, or Firm—Wegner, Stellma, McCord, Wiles & Wood

[57] ABSTRACT

A sprocket for driving a chain has a pocket between adjacent teeth at least partially defined by an arcuate root surface and oppositely disposed topping surfaces. The root surface, in turn, is defined by a radius centered on the pocket center line having a length at least as great as the sum of the radius of the chain bushings plus one half the backlash of the chain. The topping surfaces lie radially outward from the respective ends of the root surface and are defined by radii centered at points circumferentially spaced from the pocket. The topping surfaces may extend outwardly from the respective ends of the root surface and at the point of merger be tangent therewith.

10 Claims, 2 Drawing Figures

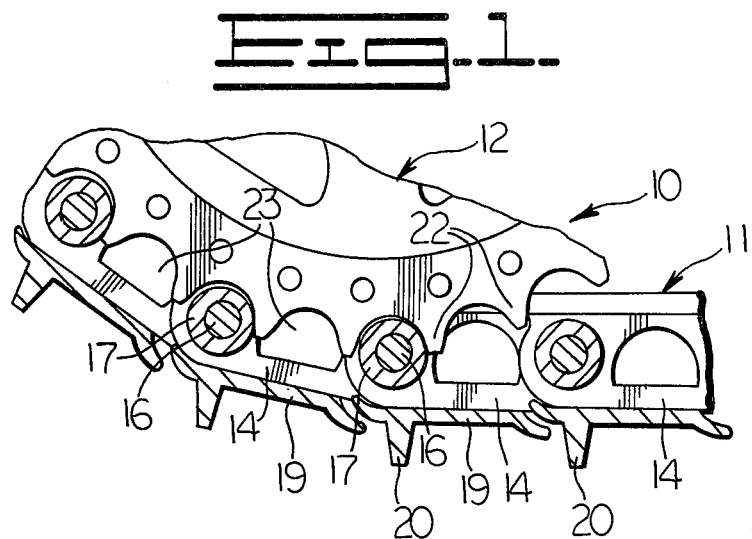
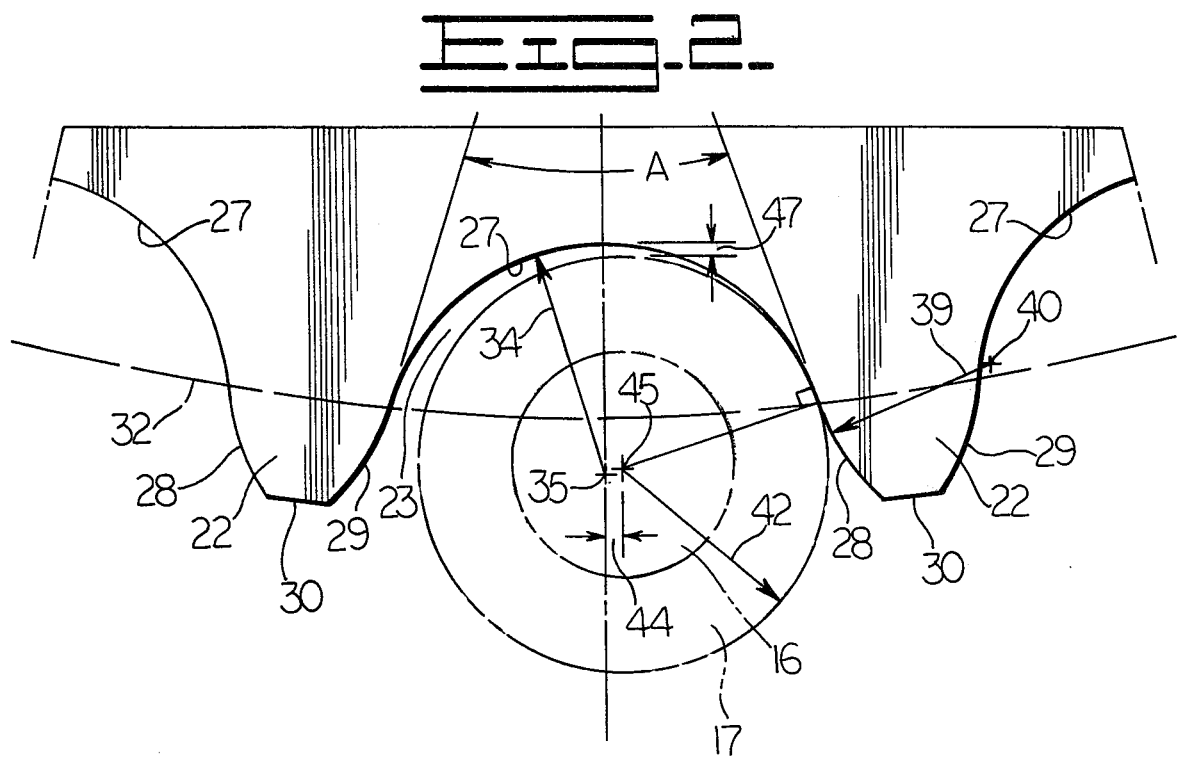

SPROCKET PROFILE

BACKGROUND OF THE INVENTION

1. Field of the Invention

This invention relates to a sprocket configuration and, more particularly, to a chain drive sprocket having a novel tooth and pocket profile.

2. Description of the Prior Art

In vehicle chain drives, such as those found in crawler tractors having a track comprised of interconnected track links, the track is driven and guided by a drive sprocket. The sprocket has a plurality of teeth defining a predetermined pitch and also defining pockets between adjacent teeth into which the track bushings are received as they are driven by the teeth.

In one conventional sprocket configuration, the sprocket root surface, at least partially defining the pocket between adjacent teeth, is cylindrical in shape and is either equal to or slightly larger than the diameter of the track bushing. Conventionally, such root surfaces either extend outwardly to the peripheral surface of the sprocket or merge with a linear surface, which, in turn, merges with a topping surface extending to the outer periphery of the sprocket.

The environment in which such sprockets and track-type chains are employed usually results in the accumulation of foreign matter in the pocket which tends to urge the chain outwardly from the bottom root surface of the pocket and causes the chain bushing to ride out on the tooth face away from the bottom root area thereby causing an elongation of the chain during driving operation. This outward movement of the chain relative to the pocket causes the bushing to make contact with the outer portions of the sprocket teeth causing undesirable wear of the bushings.

It is further recognized that a certain amount of so-called "backlash" is an inherent feature in chain drives. This backlash is the distance that the bushing will move within the pocket between forward rotation of the sprocket and reverse rotation of the sprocket. The amount of backlash is usually a specified amount that is based upon a number of factors, such as the wrap angle of the chain about the sprocket, or the amount of buildup allowance that is designed into the sprocket. In order to prevent excessive wear of the sprocket, allowance must be made both for the buildup between the bushing and the root surface and for backlash so that track jumping problems and break-in wear are reduced.

SUMMARY OF THE INVENTION

The prevent invention is directed to overcoming one or more of the problems as set forth above.

According to the present invention, the sprocket includes pockets having an arcuate bottom root surface defined by a radius centered on a point on the pocket radial center line spaced outwardly from the pitch circle of the sprocket. Herein, the radius has a length at least as great as the sum of the radius of the chain bushing plus one-half the backlash. Each root surface is thus defined by a radius that is larger than the radius of the chain bushing. Outer topping surfaces are provided which extend radially to the outer peripheral tip of the teeth.

This sprocket tooth configuration provides increased support for the bushing and further provides a desirable allowance for limited buildup between the bushing and the root surface.

The sprocket tooth profile is defined by a root surface having a continuous arc defined by a fixed radius. The pockets can be configured without rectilinear surfaces, if desired, so that the root surface joins the topping surface and is tangent therewith at the point of merger. thus, an accurate "seat" for the bushing is provided to prevent the bushing from riding up and down the sprocket tooth. The topping radius is relatively small thereby allowing a greater area for taking up the slack in the chain before the bushing climbs onto the tooth.

When the pocket surfaces, i.e., the root and topping surfaces, have circular cross-sectional profiles and no linear or non-circular surfaces, the sprocket has a relatively small number of differing surface profiles so that machining of the sprocket is relatively simple and inexpensive.

Thus, the present invention comprehends an improved chain drive sprocket which is an extremely simple and economic construction and yet provides the highly desirable aforementioned features.

BRIEF DESCRIPTION OF THE DRAWINGS

Other features and advantages of the invention will be apparent from the following description taken in connection with the accompanying drawing wherein:

FIG. 1 is a fragmentary side elevational view of a chain drive having a curved sprocket configuration embodying the invention; and FIG. 2 is an enlarged fragmentary elevational view of the sprocket embodying the invention with the chain bushing shown in transverse section illustrating the cooperation between the bushings and the sprocket teeth.

DESCRIPTION OF THE PREFERRED EMBODIMENTS

In the exemplary embodiment of the invention as disclosed in the drawings, a chain drive, generally designated 10, includes a chain, generally designated 11, and a sprocket, generally designated 12. The chain, which may be an endless track for a tractor, includes a plurality of track links 14 interconnected by a plurality of transverse pins 16 coaxially carrying sleeve-like bushings 17. Fixed to the track links 14 are track shoes 19 having grouser bars 20.

The sprocket 12 has a plurality of radially-extending teeth 22 which are circumferentially spaced apart to define a corresponding plurality of pockets 23. The sprocket teeth 22 engage the transverse bushings 17 within the pockets 23 so that when the sprocket 12 is rotated, the chain 11 is driven. As best seen in FIG. 1, the chain 11 defines an effectively polygonal pitch line extending between the respective bushings 17. This pitch line may be varied radially from the central rotational axis of the sprocket 12 as by the stretching of the chain 11 during use. The invention is concerned with an improved sprocket tooth profile providing an arcuate "seat" for the bushing 17 so as to prevent the bushing from riding up and down the sprocket tooth 22 and causing wear. The sprocket tooth profile also permits the taking up of a slack in the chain 11 before the bushing 17 climbs on tooth 22.

As seen in FIG. 2, the improved configuration of the pockets 23 is defined by an inner arcuate root surface 27 and outer arcuate topping surfaces 28 and 29 merging into the root surface 27. Each tooth 22 is thereby defined by a portion of a pair of root surfaces 27, by a pair of topping surfaces 28 and 29 and a peripheral tip surface 30. The sprocket 12 further defines a tooth pitch circle 32.

As seen in FIG. 2, the radius 34 defining the root surface 27 is centered on a point 35 lying on the pocket radial center line 37 and spaced radially outward from the tooth pitch circle 32. Each of the outer topping surfaces 28 and 29 is defined by a radius 39 centered on a point 40 located in an adjacent tooth pocket area so that the outer topping surface 28 is tangent to the root surface 27 at a point of merger. The arcuate profile of the topping surface 28 provides minimum wear relative to the bushing 17 during operation of the chain drive in the event the bushing 17 is urged outwardly toward the peripheral tip surface 30 of the tooth so as to provide improved life and minimize maintenance.

A sprocket as comprehended herein may include a pocket profile having a short straight length between the respective outer ends of arcuate root surface 27 and the outer topping surfaces 28 and 29, which may fall in the area of bushing contact.

The radius 42 of the bushing 17 is slightly smaller than the root surface radius 34. Because of the stretching of the chain 11 and the amount of slack usually found in such a drive, backlash is normally encountered. This backlash is the distance that the bushing 17 will move when the sprocket 12 is run in a forward direction (FIGS. 1 and 2) as compared to its position when run in a reverse direction (not shown). One half of the backlash is the distance designated 44 between the pocket center line 37 and the center point 45 of the bushing 17. By setting the pocket root surface radius 34 equal to the sum of the bushing radius 42 plus at least one half of the backlash, certain advantages are achieved herein. One such advantage is the additional clearance, designated 47, between the root surface of the sprocket and the bushing to accommodate buildup. Another advantage is the greater bushing support provided by the sprocket teeth.

The sprocket 12 comprehended herein may drive a track having a predetermined backlash. Illustratively, the root surface radius 34 is approximately 1.09 to 1.15 times the bushing radius 42, the backlash being approximately 0.18 to 0.28 times the bushing radius 42. The tooth angle, designated A, is typically between 44° and 60°, while the topping surface radius 39 is approximately 0.75 times the root surface radius 34. Herein, the radius of the peripheral tip surface 30 extending from the rotational axis of the sprocket 12 is approximately 11.75 times the root surface radius 34 and the radius 34 of said root surface is approximately 0.12 to 0.25 inches greater than the bushing radius 42.

The foregoing disclosure of a specific embodiment is illustrative of the broad inventive concepts comprehended by the invention.

The embodiments of the invention in which an exclusive property or privilege is claimed are defined as follows:

1. In a chain drive including a sprocket member and a chain with spaced cylindrical bushings and having a preselected backlash, said sprocket member having a plurality of circumferentially spaced teeth defining pockets therebetween centered on a radial center line, said teeth being defined by a pitch circle of preselected radius, an improved pocket configuration comprising:
    an arcuate bottom root surface defined by a radius centered on a point on said pocket center line spaced outwardly of said pitch circle, said radius being at least as great as the sum of the radius of said bushing plus one half of said backlash; and
    an arcuate outer topping surface radially outward from each end of said root surface each topping surface extending to the periphery of the sprocket member.

2. The chain drive structure of claim 1 wherein each topping surface merges with its respective end of said root surface and is tangent to said root surface at the pont of merger.

3. The chain drive structure of claim 1 wherein said topping surface is defined by a radius centered on a point spaced circumferentially from the pocket.

4. The chain drive structure of claim 3 wherein the topping surface radius is centered in an adjacent pocket.

5. The chain drive structure of claim 1 wherein said teeth define an arcuate peripheral tip surface having a radius centered on the rotational axis of said sprocket member.

6. The chain drive structure of claim 5 wherein said tip surface radius is at least 10 times greater than the root surface radius.

7. The chain drive structure of claim 1 wherein the backlash is approximately 0.18 to 0.28 times the bushing radius and the root surface radius is approximately 1.09 to 1.15 times the bushing radius.

8. The chain drive structure of claim 7 wherein the topping surface radius is approximately 0.75 times the root surface radius.

9. The chain drive structure of claim 1 wherein the tooth angle is approximately 44° to 60°.

10. The chain drive structure of claim 1 wherein the root surface radius is approximately 0.12 to 0.25 inches greater than the bushing radius.

* * * * *